United States Patent [19]
Lenz et al.

[11] Patent Number: 5,274,448
[45] Date of Patent: Dec. 28, 1993

[54] CIRCUIT ARRANGEMENT FOR DETECTING A TV SYNCHRONIZING SIGNAL

[75] Inventors: Kuno Lenz; Rudolf Koblitz, both of Villingen-Schwenningen, Fed. Rep. of Germany

[73] Assignee: Deutsche Thomson-Brandt GmbH, Villingen, Fed. Rep. of Germany

[21] Appl. No.: 908,715

[22] Filed: Jul. 9, 1992

Related U.S. Application Data

[63] Continuation at PCT/EP90/02085, filed Dec. 4, 1990.

[30] Foreign Application Priority Data

Dec. 11, 1989 [DE] Fed. Rep. of Germany ....... 3940860

[51] Int. Cl.⁵ .............................................. H04N 5/05
[52] U.S. Cl. .................... 358/148; 358/158; 358/159; 331/20
[58] Field of Search .............. 358/165, 140, 149, 158, 358/159; 331/20

[56] References Cited

U.S. PATENT DOCUMENTS

| | | | |
|---|---|---|---|
| 4,092,672 | 5/1978 | Aschwanden | 358/149 |
| 4,555,679 | 11/1985 | Katsuyama | 331/20 |
| 4,677,484 | 6/1987 | Pitsch et al. | 358/155 |
| 4,860,102 | 8/1989 | Dieterle et al. | 358/158 |
| 5,038,116 | 8/1991 | Motté | 358/158 |

FOREIGN PATENT DOCUMENTS 0253402 1/1988 European Pat. Off. .
0314074 12/1988 Japan .
0069076 3/1990 Japan .

OTHER PUBLICATIONS

IEEE Transactions on Consumer Electronics, Band 35, Nr. 3, Aug. 1989, IEEE, Y. Baba et al: "A new multi-standard video processor including deflection drive circuits which is controlled by digital process", pp. 308–313.

Primary Examiner—Mark R. Powell
Assistant Examiner—Jeffrey S. Murrell
Attorney, Agent, or Firm—Joseph S. Tripoli; Joseph J. Laks; Daniel E. Sragow

[57] ABSTRACT

A circuit for detecting a square wave television signal in a television receiver includes an oscillator for generating the square wave signal and a phase locked loop (PLL) for synchronizing the square wave signal with the syn pulses of the televsion receiver. The circuit also includes an integrator for switching the output signal of the PLL to a frequency stable square wave signal when the syn pulses are absent and a Schmitt trigger for closing the PPL when a threshold value is reached. With the invention, the syn signals are sensed and a first switchable constant current source increases the output voltage of the integrator for a predetermined period of time when syn pulses are present during the first half of the square wave signal and discharges the integrator when syn signals are absent from the second half of the square wave signal.

8 Claims, 3 Drawing Sheets

CIRCUIT ARRANGEMENT FOR DETECTING A TV SYNCHRONIZING SIGNAL

This is a continuation of PCT application PCT/EP 90/02085, filed Dec. 4, 1990 by Kuno Lenz and Rudolf Koblitz and titled "Circuit Arrangement For Detecting A TV Signal".

The invention is directed to a circuit for detecting a television signal in a receiver, in which a phase-locked loop (PLL) synchronizes a rectangular-wave horizontal-frequency signal in frequency and phase with the television signal. Sources of constant current simultaneously charge and discharge an integrator as the pulses that synchronize the television signal coincide with the square-wave signal. When a certain threshold appears at the output terminal of an integrator, a Schmitt trigger generates a MUTE signal that closes a loop that controls the phase-locked loop PLL. When a different threshold occurs, the trigger opens the loop again and the rectangular-wave signal adjusts to a stable frequency.

The object of the present invention is to display a nonjittering image on a television screen when the television signal is absent or noisy and, when the television signal is present, it will be immediately detected for the purpose of synchronizing the phase-locked loop and hence the rectangular-wave horizontal signal.

A preferred embodiment of the invention is described with reference to the drawings, in which.

Figure 1:
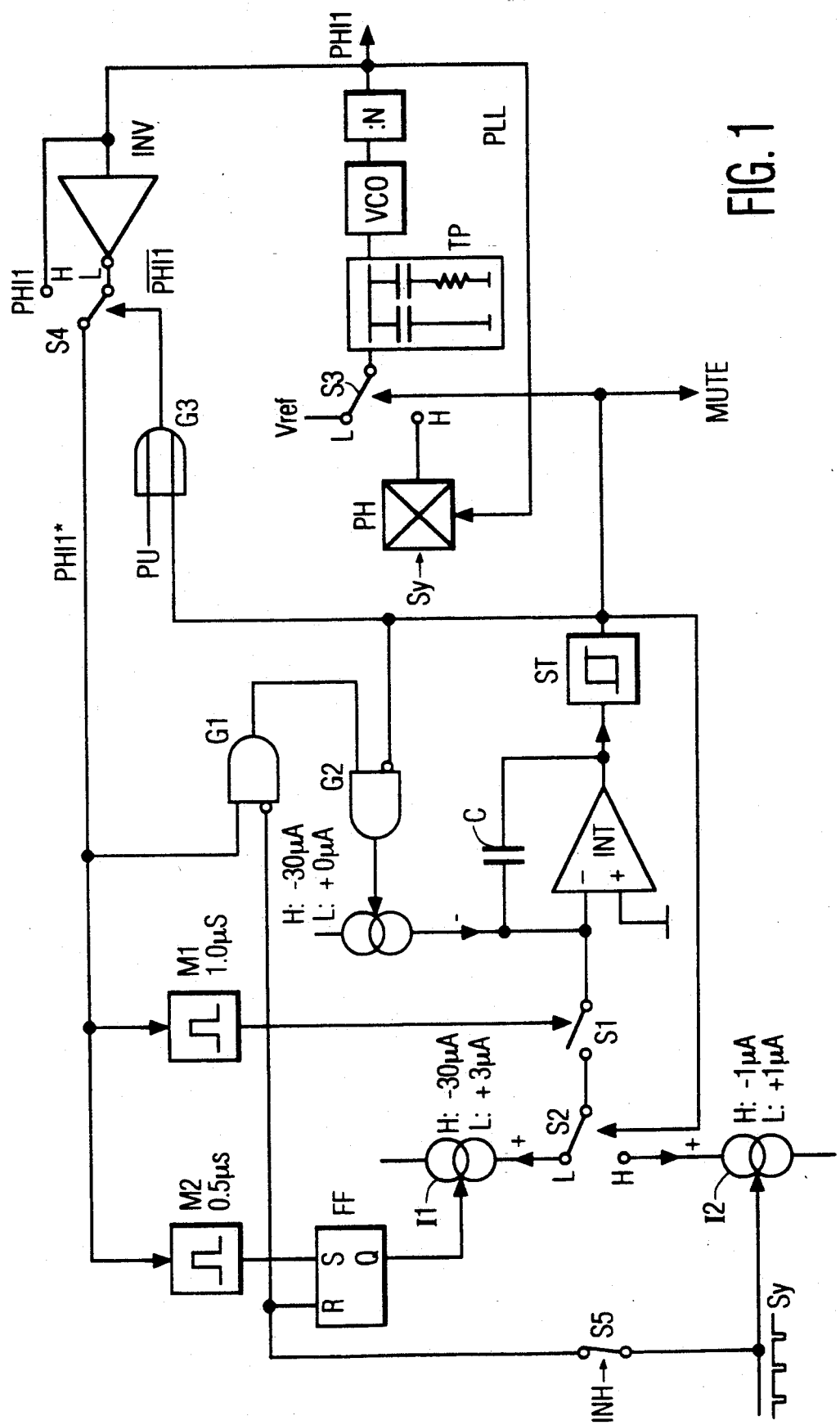
FIG. 1 is a block diagram of the invention.

Those aspects of the circuitry shown in FIG. 1 that are state of the art are described first. A phase-locked loop PLL, of known type includes a voltage-controlled oscillator VCO, a frequency divider N, a phase comparator PH and a low-pass filter TP. The phase-locked loop PLL controls the oscillator VCO and generates a symmetrical horizontal-frequency rectangular wave signal PHI1 and hence also a PHI1* signal. The phases of the signal PHI1* and the television-signal synchronization pulses Sy are compared, and the frequency of the PHI1 signal is varied until its positive edge coincides with the midpoint of synchronization pulses Sy. In the resulting synchronous state, a signal from a Schmitt trigger ST will be at high potential, and the loop that controls phase-locked loop PLL will be closed by way of a contact H of a switch S3. When the television signal is weak or noisy, Schmitt trigger emits a low signal, and switch S3 is set to the L contact and oscillator VCO is set at a constant reference voltage $V_{ref}$ that shifts the oscillator to a standardized deflection frequency (e.g. 15,625 Hz). Schmitt trigger ST outputs a HIGH voltage signal when integrator INT outputs an upper voltage $U_H$ dictated by the trigger's hysteresis, thereby closing the PLL-control loop. Current from a constant source I2 and controlled by synchronization pulses Sy is supplied to the input terminal of integrator INT from a switch S1. Switch S1 is controlled by the positive side of rectangular signal PHI1*. Constant current source I2 supplies, in accordance with the potential at the control input terminal, two equal currents flowing in opposite directions, +1 and −1 $\mu$A for example. In the preferred embodiment, constant current source I2 supplies a positive current when a synchronization pulse Sy is present and a negative current when no synchronization pulse Sy is present. When the synchronization pulses coincide with the correct edge of signal PHI1* the output voltage of integrator INT increases 0.14 V for each pulse, when integrator INT has a capacity C, of 7 pf, for example, until the upper triggering threshold $V_H$ of Schmitt trigger ST is attained. Otherwise, constant source I2 switches over to a current of opposite polarity, and the output voltage from the integrator INT decreases by equal increments of 0.14 V until the trigger's lower triggering threshold $V_L$ has been attained.

When the circuitry is in the a synchronous state, in which no valid synchronization pulses are detected, the MUTE potential is low. It then is necessary to search for and find a television signal. This function is carried out with the circuitry in accordance with the invention.

The SEARCH mode of operation exploits the fact that the frequency of the synchronization pulses Sy in a valid television signal must be within a particular tolerance at standard frequency. This means, however, that a minimum of sequential synchronization pulses will always occur in a particular phase of the rectangular wave signal PHI1 or PHI1*. For the SEARH mode, constant current source I2 is turned off by switch S2, and another constant source I1 begins to supply current to the input terminal of integrator INT. The change is executed by way of a switch S2, which is controlled by the output signal of the Schmitt trigger ST. When a signal is provided to its control input terminal, constant current source I1 provides two different currents, one of +3 $\mu$A and another of −30 $\mu$A for example. The +3 $\mu$A current charges integrator INT 0.42 V every time switch S1 closes. The −30 $\mu$A current discharges integrator INT very rapidly. Two conditions must be satisfied during the SEARCH mode in order to switch constant sources I1 to +3 $\mu$A while switch S1 is closed. First, synchronization pulse Sy must occur during a particular phase of signal PHI1*, while it is low for example, and no pulse must occur during the other phase of that signal. Constant current source I1 is switched to the high negative −30 $\mu$A current when the negative edge of signal PHI1* sets a bistable flip-flop FF by way of a monostable flip-flop M2. During the subsequent low phase of signal PHI1*, a synchronization pulse Sy must arrive at the reset input terminal R of bistable flip-flop FF, setting its Q output terminal to low potential again and switching constant current source I1 to the +3 $\mu$A. The resulting pulse from monostable flip-flop M1 activates switch S1 and the adjusted current is provided to the input terminal of integrator INT. Constant current source I2 thus provides +3 $\mu$A current when the circuitry detects a synchronization pulse Sy. This procedure, however, must be repeated several times, 10 times for example, in order to exceed the Schmitt-trigger threshold.

Figure 2:
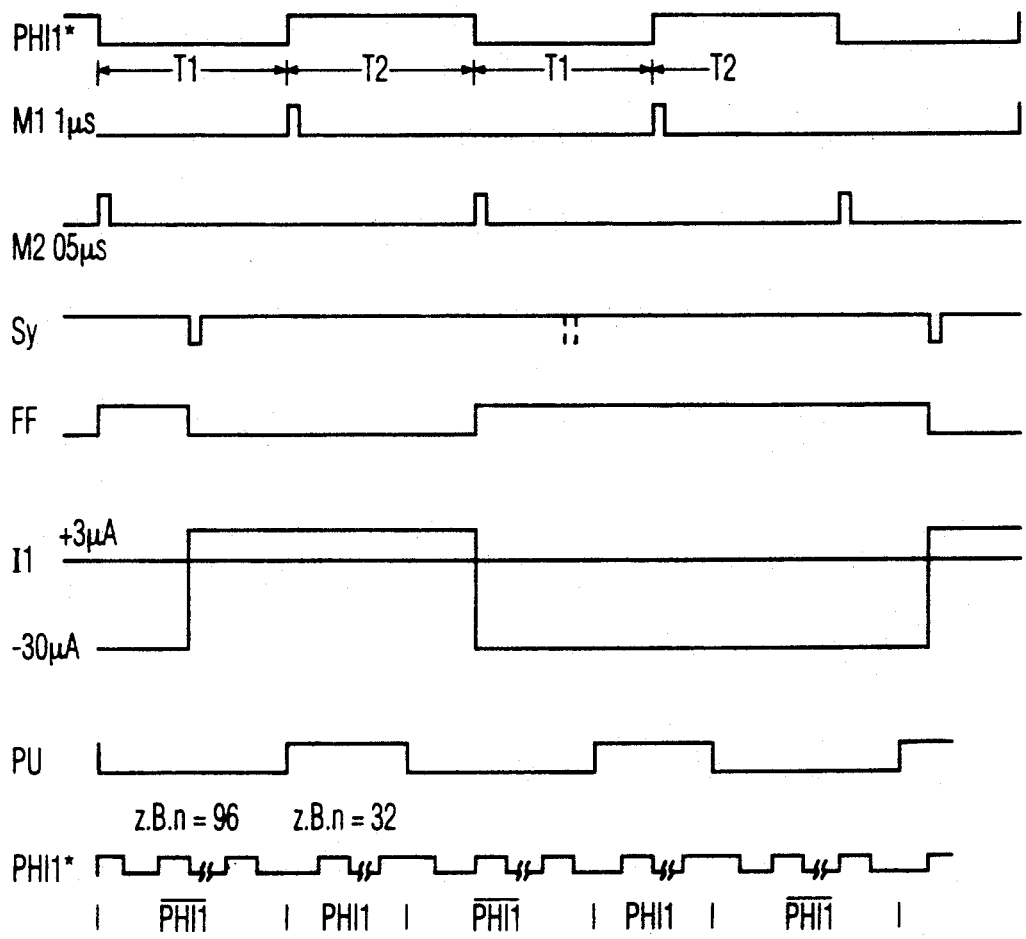
FIGS. 2 and 3 are time based waveforms that illustrate how the invention operates.

Signal PHI1* is plotted in FIG. 2. The positive edge of the PHI1 signal triggers monostable flip-flop M1, which provides a pulse lasting 1 $\mu$sec, for example, that closes switch S1. The negative edge of signal PHI1* triggers monostable flip-flop M2, which emits a pulse lasting 0.5 $\mu$sec, for example, that sets bistable flip-flop FF. It will be evident that the second synchronization pulse, plotted with the broken line, is absent. Bistable flip-flop FF has accordingly not been reset when the 1 $\mu$sec pulse occurs. The voltage from the bistable flip-flop determines the level and direction of the current from constant current source I1. At this particular instant constant source I2 is operating at the −30 $\mu$A current, thereby resetting integrator INT.

Figure 3:
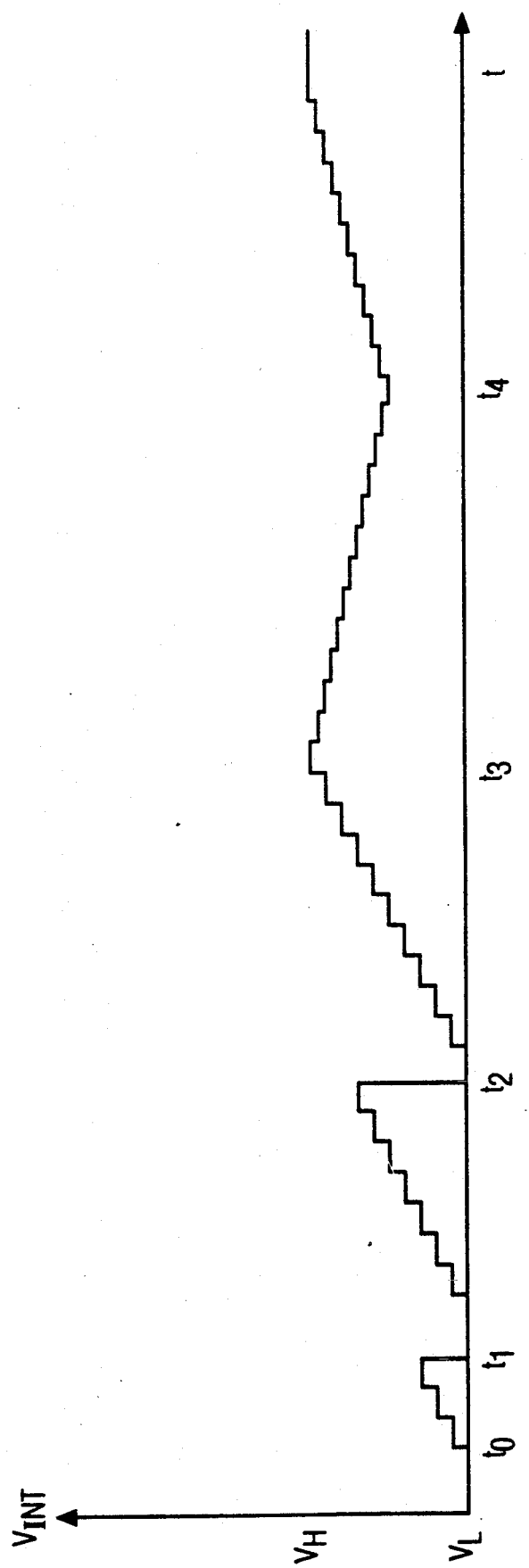

FIG. 3 illustrates the various conditions as a function of time. The first valid synchronization pulse Sy is detected at time $t_0$. The voltage $V_{INT}$ at integrator INT is increased 0.42 V. This is followed by additional incremental increases in the output voltage whenever a valid synchronization pulse Sy occurs. Assume as invalid pulse at time t1 occurs during the prohibited phase of signal PHI1*. This situation can occur when a gate G1 increases an INH signal from switch S5 and a positive signal PHI1* causing the gate G1 output terminal to go high H. The H signal is applied to a second gate G2 which also receives the Schmitt trigger ST output signal. The H signal on the output terminal of gate G2 switches on a constant current source 13 that quickly discharges and accordingly resets integrator INT. The SEARCH is repeated, recharging integrator INT once during the subsequent interval. At time t2, however, the process is interrupted again because, for example, there is no synchronization pulse Sy during interval T1 to reset bistable flip-flop FF. This switches constant source I1 to $-30$ μA, immediately resetting the integrator. The SEARCH procedure begins again until, at time t3, the upper triggering threshold $V_M$ of Schmitt trigger ST is attained and its output terminal will convert to H. Switch S3 will accordingly now close the PLL-control loop. Switch S2 will connect constant source I2. The known controls will engage as of time t3. Although it is now evident that the signal is a television signal, signal PHI1 is not yet in phase with the synchronization pulse. Integrator INT is accordingly discontinuously discharged by constant source I2 until phase-locked loop PLL engages, which occurs at time t4, when integrator INT again discontinuously increases its output voltage. The hysteresis of Schmitt trigger ST keeps constant source I2 on and the control loop closed during this procedure.

Synchronization pulses Sy may sometimes occur during the wrong phase of signal PHI1* at the beginning of the SEARCH procedure. To accelerate the restoration of these pulses to the correct phase, when signal PHI1 is almost at standard frequency, the signal is periodically switched over. When the frequency of signal PHI1 is precisely standard, the SEARCH procedure could even proceed indefinitely without the switching. The two bottom waveforms in FIG. 2 illustrate the phase shift of signal PHI1. It will be evident that the inverted signal PHI1 remains switched through to signal PHI1* longer than the uninverted signal PHI1 does. Only during the SEARCH procedure, accordingly, is a phase-shift signal PU present to either forward signal PHI1 directly or rotated 180° by an inverter INV. Phase-shift signal PU should be unsymmetrical, meaning that its sampling ratio should not be 0.5 in order to avoid the problem that, when an almost standard Sy frequency occurs, the phase shift might always switch the synchronization pulse into the same phase of signal PHI1, thereby considerably decelerating the switching procedure that detects the synchronization pulse or completely eliminating detection. Subsequent to every phase shift on the part of phase-shift signal PU, it must be ensured that integrator INT will commence integrating or counting valid pulses from the start. This is attained with a signal INH that briefly opens a switch S5 to forcibly prevent the resetting of bistable flip-flop FF, retaining the source of constant current at the high discharge current of $-30$ μA.

When the circuitry described herein is integrated into a single circuit on one chip, it can be designed to accommodate tolerance-dictated changes in the individual components by means of countervailing changes on the part of other components. If, for example, technology dictates a higher capacity for the integrator, which will accordingly require a greater charge to activate the Schmitt trigger, the capacity can be increased to increase the time constant of monostable flip-flop M1 to the same extent, increasing the charge on the integrator and vice versa. The time constant is, in any case, proprotional to the dimension of the current from one source, whereas the voltage lift for the integrator is proportional per unit of time to the dimension of the current from another source. If these sources are integrated by means of current levels of the same type, the effects of current fluctuations will be increased.

We claim:

1. In a circuit for detecting a television signal in a television receiver, said circuit including an oscillator for generating a rectangular wave signal, and a phase locked loop (PLL) for synchronizing said rectangular wave signal with the sync pulses of said television signal, said circuit also including an integrator for detecting the absence of said sync pulses and for switching the output signal of said phase locked loop to a frequency stable rectangular wave signal when said sync pulses are absent, and a trigger coupled to said integrator for closing said PLL when said integrator reaches a predetermined value, an improvement comprising:

means for sensing said sync pulses; and a first switchable constant current source for varying in a first sense the output signal of said integrator for a predetermined period of time when sync pulses are present during a first interval of a cycle of said rectangular wave signal, and for varying in an opposite sense the output signal of said integrator when sync pulses are absent during a second interval of a cycle of said rectangular wave signal.

2. The improvement of claim 1 further including a second switchable current source for resetting said integrator when sync pulses are present during the second interval of a cycle of said rectangular wave signal.

3. The improvement of claim 2 wherein said means for sensing includes a monostable flipflop for receiving said rectangular wave signal, and a bistable flipflop responsive to the output of said monostable flipflop and to said sync pulses for controlling said first switchable constant current source.

4. The improvement of claim 3 further including means for providing a switch-over signal for periodically changing the phase of said rectangular wave signal by 180°.

5. The improvement of claim 4 wherein the keying ratio of said switch-over signal is different from 0.5.

6. The improvement of claim 1 comprising an additional source of current coupled to said integrator, which resets the integrator when sync pulses are present during the second interval of a cycle of said rectangular wave signal.

7. The improvement of claim 6 comprising means for generating said source of current when the sync pulses coincide with an incorrect phase of said rectangular wave signal.

8. The improvement of claim 6 comprising means for resetting the integrator after each change of phase.

* * * * *